Oct. 9, 1923.
H. LAMB
FILLING MACHINE
Filed July 2, 1921
1,470,381
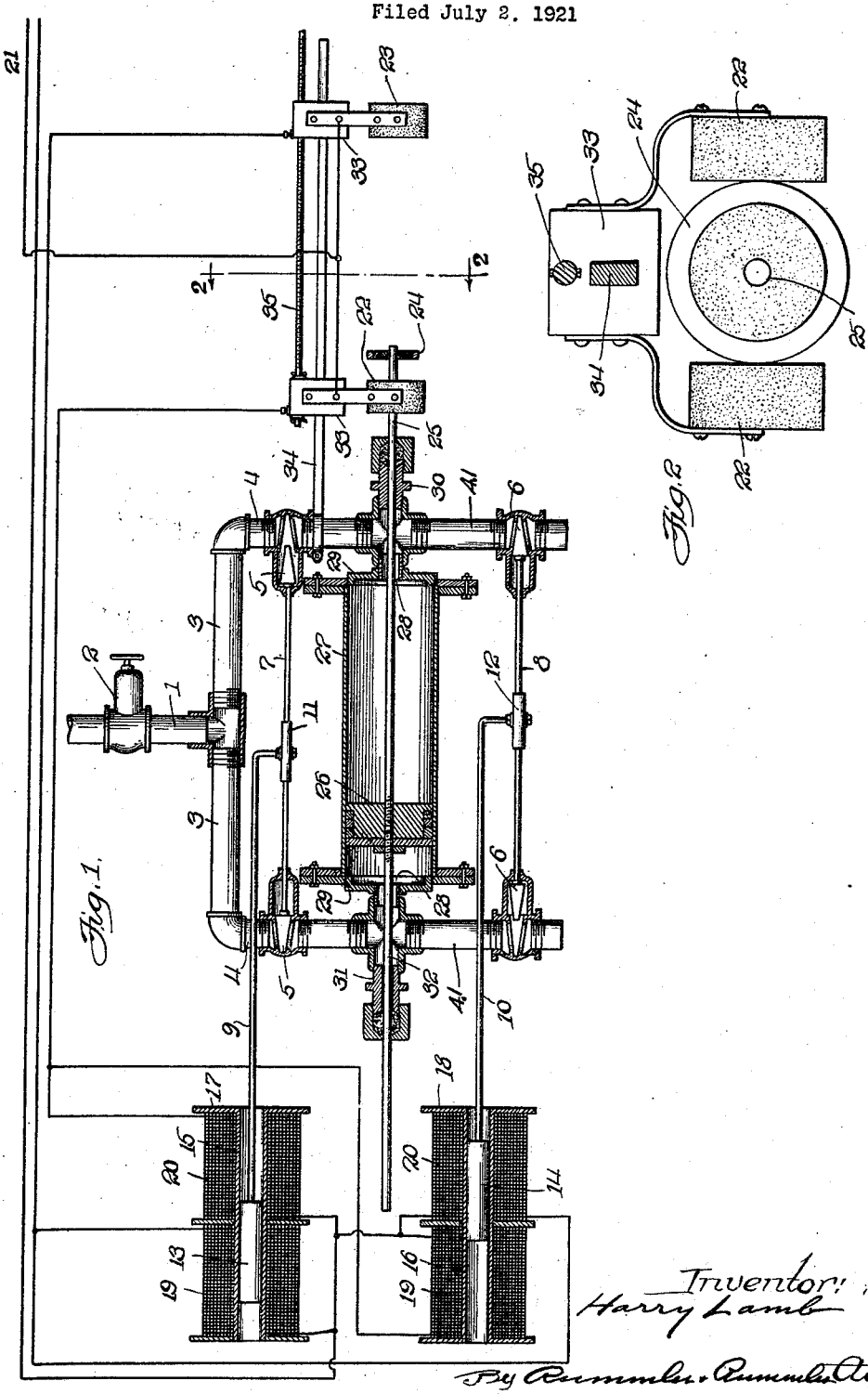
Inventor:
Harry Lamb

UNITED STATES PATENT OFFICE.

HARRY LAMB, OF NEW WESTMINSTER, CANADA, ASSIGNOR TO SWIFT & COMPANY, OF CHICAGO, ILLINOIS, A CORPORATION OF ILLINOIS.

FILLING MACHINE.

Application filed July 2, 1921. Serial No. 482,267.

*To all whom it may concern:*

Be it known that I, HARRY LAMB, a subject of the King of Great Britain, and a resident of New Westminster, British Columbia, Canada, have invented a new and useful Improvement in Filling Machines, of which the following is a specification.

This invention relates to improvements in machines driven by a fluid or other material which may be pumped through a conduit to the machine, and by it delivered in predetermined measured quantities to receiving receptacles such as cans. The device is designed particularly for handling a material such as lard.

The objects of the invention are to utilize the pressure of the material which is pumped through a supply conduit to operate a reciprocating measuring piston and control coacting valves, whereby predetermined quantities of the material are alternately forced through branches from the supply conduit and delivered to the receiving receptacles. A further object of the invention is to provide continuously operable measuring mechanism of this class, the speed of which may be varied at will, and also one which provides convenient means for regulating the quantity of successive alternate discharges through the branch delivering conduits.

These objects are accomplished by the device shown in the accompanying drawing, wherein—

Figure 1 is a diagrammatic view, partly in section, of a measuring machine constructed according to this invention.

Figure 2 shows in detail one of the electrical contact devices by means of which the action of valves in the discharge conduit is regulated.

The principal features of the design shown are a supply conduit through which the fluid or lard to be measured is continuously pumped at a rate which may be regulated by a valve in this conduit. A plurality of delivering branches extend from the supply conduit, and are controlled by automatic valves which alternately admit the fluid to these branch conduits. The branch conduits are also provided with valves at their discharge ends which alternately open and close. When one branch conduit is being filled, a cylinder which has communication with a air of the branch conduits also receives the liquid, and the piston therein is driven toward the end of the cylinder communicating with the branch having its discharge valve open, and thereby causes the discharge of a quantity of the liquid, determined by the capacity of the cylinder and a branch conduit. As the piston reaches the end of its stroke, all of the valves in the branch conduits are automatically reversed in position and the piston is then driven toward the opposite end of the cylinder, thus discharging what lard it had received during the previous stroke. With this arrangement, no power is required to drive the mechanism other than that obtained from the pressure of the moving fluid which is pumped along the supply conduit.

In the drawings, the pump or screw for driving the fluid through the supply conduit is omitted, and the valves in the branch supply and discharge conduits are shown as gate valves driven by solenoids, although other types of valves and different operating means could be substituted for that shown to meet the requirements of the particular material being measured. The supply conduit 1 is shown provided with a manually adjustable valve 2, and communicates with lateral extensions 3, from which depend the branch supply conduits or spouts 4 and discharge conduits 4.1. Each of the branches 4 is provided with a valve 5 at its inlet end, and each of the discharge conduits 4.1 is provided with a valve 6 at its outlet end. These two pairs of valves are rigidly connected by rods 7 and 8 so that when one valve is open its companion valve will be closed. Motion is imparted to the valve rods 7 and 8 for shifting the two pairs of valves in opposite directions by the rods 9 and 10, connected with the rods 7 and 8 through the attachments 11 and 12. The ends of rods 9 and 10 are provided with iron cores 13 and 14, slidably mounted in the tubes 15 and 16 of helix spools 17 and 18, each of which is provided with a helix 19 and 20, which are connected to a line circuit 21 through the pairs of contacts 22 and 23. The pairs of contacts 22 and 23 serve to alternately close the circuits of the different helixes in the solenoids, as required for the correct operation of the valves in branches 4, by means of a copper ring 24 carried on a reciprocating rod 25, rigid with a piston 26. This piston is slidable in a cylinder 27 which is mounted between the two branch conduits 4 and communicates with these conduits through apertures 28 in the heads 29 of the cylinder. The rod 25 has a bearing 30 to steady its motion, and likewise a bearing 31 is provided for a guiding rod 32, extending from the opposite end of the piston. These rods have threaded engagement with the piston 26 for convenience in changing the width of the piston or substituting another for it in order to vary the holding capacity of cylinder 27, and accordingly the quantity of substance discharged at each stroke.

The length of the stroke of the piston may also be controlled by an adjustment of contacts 22 and 23 toward and away from each other. This is provided for by mounting these pairs of contacts on blocks 33, one of which is slidable along a supporting bar 34 and is adjusted along this bar by means of the screw 35 having threaded engagement with the adjustable block.

In the operation of the device, the lard which is pumped along the supply conduit 1 passes through the branch 3 and into the particular spout 4, in which the inlet valve 5 is in open position, and the outlet valve 6 in the same branch in closed position. The lard or material being handles also enters the cylinder 27 through its communication with the branch conduit, and the piston 26 is forced toward the opposite end of the cylinder, discharging the material in front of it, until the contact member 24 closes the circuit through the pair of contacts 22. As the helix 20 of spool 17, and 19 of spool 18 are in this circuit, the position of the solenoid cores 13 and 14 as shown in the diagram is reversed and the valves in the branch conduits are accordingly shifted, thus shutting the discharge valve for the conduit which had been discharging, and opening the discharge valve of the remaining branch conduit. The inlet valves of these branches are also reversed in position, and accordingly the piston is driven in the opposite direction, and the charge which had previously driven the piston will be forced through its branch discharge conduit into a receiver below the same.

By means of the valve 2, or otherwise controlling the rate at which the lard is pumped along the supply conduit 1, the speed of the apparatus is regulated and the desired rate of discharge through the branch conduits 4.1 may be effected.

Although but one specific embodiment of this invention has been herein shown and described, it will be understood that numerous details of the construction shown may be altered or omitted without departing from the spirit of this invention as defined by the following claims.

I claim:

1. In a measuring apparatus of the class described, a cylinder, a piston in said cylinder, supply conduits communicating with said cylinder on opposite sides of said piston, discharge conduits communicating with the ends of said cylinder, valves controlling said conduits, electro-magnetic means for automatically actuating said valves to alternately open the inlet and close the outlet at one end of said cylinder and simultaneously close the inlet and open the outlet at the other end thereof whereby said piston is reciprocated by the pressure of the fluid entering said cylinder, and a switch controlling said valve actuating means, said switch being controlled by the position of said piston relative to said cylinder and being also adjustable so as to be adapted for control at variable points in the stroke of said piston.

2. In a measuring apparatus of the class described, a cylinder, means for delivering material under pressure alternately to opposite ends of the cylinder, a piston in said cylinder, supply and discharge spouts communicating with the ends of the cylinder, valves in said spouts, electro-magnetic means for operating said valves, a switch controlling said means, and said piston being arranged to control the operation of said switch.

3. In a measuring apparatus of the class described, a supply conduit, a delivery spout, a cylinder communicating with said supply conduit and delivery spout, a piston in said cylinder driven by the pressure of material forced along said supply conduit and forcing a definite quantity of the material through the delivery spout, valves for controlling the action of the piston, electro-magnetic means for operating the valves, and said electro-magnetic means being under the control of the piston.

Signed at New Westminster this 16th day of Oct., 1922.

HARRY LAMB.